United States Patent [19]

Tomasi

[11] Patent Number: 4,679,047
[45] Date of Patent: Jul. 7, 1987

[54] TERMINAL-GUIDANCE OR POSITION-ADJUSTMENT SYSTEM FOR AIRCRAFT USING DISTANCE AND ANGLE MEASUREMENTS

[75] Inventor: Jean-Pierre Tomasi, Les Molieres, France

[73] Assignee: U.S. Philips Corporation, New York, N.Y.

[21] Appl. No.: 737,012

[22] Filed: May 23, 1985

[30] Foreign Application Priority Data

May 29, 1984 [FR] France ................. 84 08391

[51] Int. Cl.⁴ .............................................. G01S 13/87
[52] U.S. Cl. ........................................ 342/52; 342/63
[58] Field of Search .............. 343/6 R, 7 ED; 342/52, 342/62, 63

[56] References Cited

U.S. PATENT DOCUMENTS

3,611,367 10/1971 Billottet ........................... 342/43 X
3,998,412 12/1976 Baker et al. ..................... 342/63 X Primary Examiner—T. H. Tubbesing
Attorney, Agent, or Firm—Robert J. Kraus

[57] ABSTRACT

An aircraft is equipped with a system of the FM-CW type including an on-board radio altimeter which cooperates with a transponder/beacon located at A. The radio altimeter is adapted for the measurement, alternately with the measurement of the altitude H, of the distance D in relation to point A, and of the angle $\beta$ in relation to a horizontal axis (46) linked to the transponder. The radio altimeter includes two aerials and a supplementary processing chain for the measurement of angle $\beta$. The transponder is equipped with a base with two receiving/transmitting aerials (25, 27), switched alternately to sequentially operated circuitry in the transponder. Furthermore, the exact position of the aircraft within the vicinity of point A is determined by at least two measurements of distance D and of the angle $\beta$ in relation to the aerial base of the transponder.

1 Claim, 4 Drawing Figures

TERMINAL-GUIDANCE OR POSITION-ADJUSTMENT SYSTEM FOR AIRCRAFT USING DISTANCE AND ANGLE MEASUREMENTS

BACKGROUND OF THE INVENTION

The invention relates to a terminal-guidance or position-adjustment system for aircraft, particularly for aerial reconnaissance missiles, provided with computing facilities whereby a radio altimeter installed aboard the aircraft for measurement of the altitude H cooperates with a transponder installed on the ground at site A intended for the return of the aircraft or the adjustment of its position. The radio altimeter is of the frequency-modulated continuous-wave type, with a transmitting aerial and a receiving aerial directed towards the ground. The transponder is of the pseudo-continuous-wave type comprising two-position switches for radio-frequencies and at least one receiving/transmitting aerial.

The invention is intended preferably for an aircraft having an inertial guidance device and computing facilities. A terminal-guidance or position-adjustment system of the above-identified type is known from French Patent Specification No. 2,435,866 corresponding to U.S. Pat. No. 4,358,763.

Aerial-reconnaissance missiles are generally designed for departing from a base, covering a certain predetermined route, carrying out observations above certain zones, and returning to a base which may be the base from which they departed or another base corresponding to the end of the route. All these operations are performed automatically by means, on the one hand, of an inertial guidance device which enables the missile to "know" at every instant during the flight its horizontal accelerations, speed and position and, on the other hand, of a radio altimeter indicating the height above the ground. The horizontal path and the height are programmed in advance and an on-board computer enables the intended position of the missile to be compared at any instant with the position indicated by the inertial guidance device and to make progressively the steering corrections necessary to keep the missile as close as possible to the intended path.

The path covered by the missile is of the order of several hundreds of kilometers and although its inertial guidance device is very accurate, its position error upon arrival is of the order of several hundreds of meters. However, it is desired to recover the missile or at the very least the information it has gathered in the course of its mission and this inaccuracy with regard to the position of the point of landing may prove inconvenient both with regard to the difficulty of locating exactly what has to be recovered and what may be parachuted on the return of the device and for the area to be set aside for this landing. Generally speaking, the aforementioned disadvantages are accepted and no terminal-guidance system is provided for the missile which remains independent from the start to the finish of its flight.

SUMMARY OF THE INVENTION

An object of the invention is to provide a terminal-guidance or position-adjustment system for aircraft which is simple to embody and to put into operation.

The disadvantages of the state of the art are eliminated and the object outlined above is achieved in accordance with the invention, which is characterized in that, the radio altimeter is adapted for a measurement, in a first sequence, alternating with the measurement of the altitude H, of the distance D and the angle $\beta$ in relation to a horizontal axis linked to the transponder, the system incorporating to that end:

in the radio altimeter, means for adapting the transmitting aerial as a transmitting/receiving aerial connected via a circulator and the common contact of a two-position UHF switch to two mixers which respectively receive at a second input the local oscillation signal frequency-shifted by a predetermined value of $F_1$ and $F_2$, and a chain for processing the additional signal, including one of the mixers for determination of the angle $\beta$;

in the transponder, an aerial base consisting of two omnidirectional receiving/transmitting aerials directed upwards at a predetermined distance 1 from one another on the horizontal axis whose orientation is assumed to be known on board the aircraft, and connected to the input/output point of the transponder by means of a second two-position UHF switch, operated in a second sequence contained within the first sequence, the second sequence also causing in the transponder the frequency shifts $F_1$ and $F_2$, respectively, of the signal. The operating range of the system includes the volume defined by the distance accuracies d and h peculiar to the aircraft for its independent return. The exact position of the aircraft in the immediate vicinity of point A is determined, upon the aircraft's return, by at least two measurements of the distance D and of the angle $\beta$ in relation to the aerial base of the transponder. The basic idea of the invention is, therefore, to utilize the radio altimeter already installed aboard the aircraft, by having it cooperate, in the vicinity of the point of return of or the position adjustment, with a transponder/beacon, which may be of a basically familiar type and for example as described in the French Pat. No. 2 435 866, making it possible to obtain an adequate operating range without any risk of swamping-out or locking-on of the transponder to an unwanted echo of the retransmitted signal.

In its mode as an instrument for measuring distance and angle in relation to the transponder, the radio altimeter operates with the same aerial, fixed and directed towards the ground and which is either the transmitting aerial or the receiving aerial of the radio altimeter. For transmission and reception this is made possible by the fact that the transponder is never very near and, additionally, that the transponder necessarily delays by a short time interval $\tau'$ the signal which it retransmits. On the other hand, the frequency shifts by the values $F_1$ and $F_2$ of the signals employed in the system make it possible to select each echo from the transponder by eliminating the other echo from the transponder and that from the ground. As it is not essential that the radio altimeter should operate continuously, it is thus possible to use it in the immediate vicinity of the point of arrival of the aircraft as a distance- and angle-measuring instrument, the aim being that the aircraft should itself be able to determine precisely its position in relation to point A at a position-finding point at a given instant, after which the final procedure for arriving at point A can be followed automatically in a known fashion, e.g. by means of the inertial guidance device and the airborne computing facilities, in which case the use on the on-board distance and angle-measuring device and of the transponder at point A is no longer indispensable after the aircraft's passage through the position-finding point. The angle α, the complementary of angle β, which the system makes it possible to measure as an algebraic value, is the angle which the straight line connecting the aircraft to point A makes with the median plane between the aerials of the transponder, the measurable absolute value of α being between 0° and 90°. It follows that in any angle measurement the value of α can only be determined over a range extending from −90° to +90°, i.e. 180°, and a problem of ambiguity arises, namely how to know from what side the aircraft would approach point A if it followed its independent path, i.e. if no correction were made to its path upon its arrival. In the absence of this uncertainty a single distance and angle measurement would be enough to implement the invention. In the aforesaid conditions, by performing the two distance and angle measurements it is possible to eliminate the uncertainty as to the exact position of the aircraft pointed out above.

BRIEF DESCRIPTION OF THE DRAWING

The description which follows, read in conjunction with the attached drawing figures, all given by way of example, will show how the invention can be implemented.

DESCRIPTION OF THE PREFERRED EMBODIMENT

Figure 1:
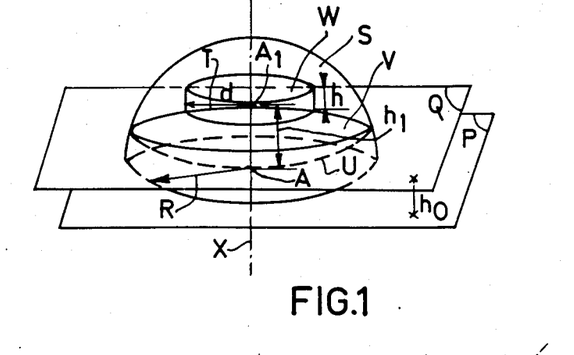
FIG. 1 shows in a three-dimensional representation the volume in which the system according to the invention can operate, in the vicinity of the point of arrival.

In FIG. 1 the ground is symbolized by a plane P to which belongs the point A intended for the arrival of the aircraft and where a transponder has been set up which is designed to receive and, after amplification, retransmit continuous frrequency-modulated waves. A half-sphere S of center A and radius R indicates the range of the guidance system, R being the extreme distance beyond which the attenuation of the waves exceeds the systems amplification capacity, distance D and angle α then ceasing to be measurable. In practice, when the aircraft arrives in the vicinity of point A, it is supposed to be at an altitude higher than a predetermined altitude $h_o$ which is smaller than R, i.e. above a surface symbolized by a plane Q in FIG. 1 located a distance $h_o$ above plane P. The intersection of the half-sphere S and plane Q is the circle T. Additionally, the directional pattern of the aerial of the transponder at point A is such that reception is possible above a curved surface of revolution, marked U, around point A and which can be likened, as a first approximation, either to a portion of a sphere or to a cone of apex A and passing through the circle T. The volume delimited by the curved surface U and by the top spherical portion of the half-sphere S limited to the circle T is a volume of revolution V around a vertical axis X passing through point A, inside of which the system according to the invention can operate, this volume V being called the second volume.

The aircraft, such as a reconnaissance missle, is designed to return to point A at a certain altitude $h_1$, which defines a point $A_1$ on the axis X. In the absence of a terminal guidance system the on-board inertial guidance device and radio altimeter will enable point $A_1$ to be reached with an accuracy d in the horizontal direction and an accuracy h in the vertical direction, thereby defining a first cylindrical volume W. The terminal-guidance system is designed such that the second volume V entirely contains the first volume W and the distances $h_o$ and $h_1$ are preferably chosen to be equal. Under these conditions, the weakest possible range R of the system is necessarily greater than the distance d prescribed by the missile or aircraft.

Figure 2:
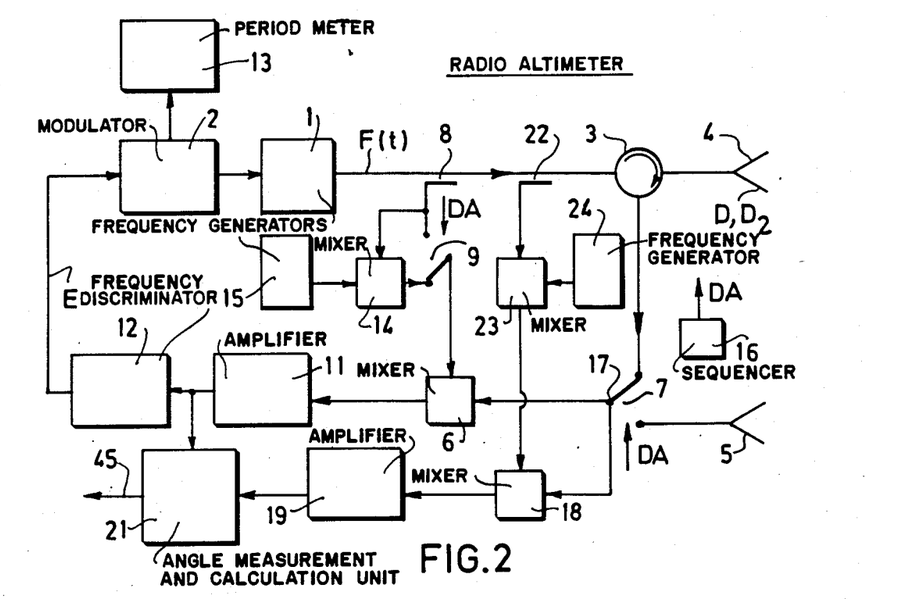
FIG. 2 is a block diagram of the radio altimeter adapted as a distance- and angle-measuring device in accordance with the invention.

The radio altimeter used in the aircraft, shown in FIG. 2, is of a familiar type and similar, for example, to those described in the French Pat. No. 2 344 031 corresponding to U.S. Pat. No. 4,107,679. This radio altimeter essentially includes a controlled-frequency generator 1 which, in response to a control signal from modulator 2 in the form of an asymmetrical sawtooth voltage or current signal with a positive-going slope, delivers a recurrent, linear frequency-modulated signal. This last signal of frequency F(t) is applied, via a circulator 3, to a preferably circularly polarized transmitting aerial 4 which is a fixed attachment on the aircraft and is directed towards the ground. The wave transmitted by aerial 4 is reflected by the ground and picked up by the receiving aerial 5. For operation as a radio altimeter, aerial 5 is connected directly to a first input of a subtractive mixer 6 by way of a two-position UHF switch 7 when it is in the opposite position to that shown in FIG. 2. The function of switch 7 is explained below. Mixer 6 also receives at a second input a fraction of the transmitted signal via a coupler 8 and a two-position UHF switch 9 when the latter is in the position opposite to that shown in FIG. 2. The frequency variations of the waves transmitted and received as a function of time have the shape of asymmetrical sawtooth signals with a positive-going slope. These curves have the same shape as the modulation signal delivered by modulator 2. The modulation period is called T. The curves of the transmitted and received signals are shifted in relation to one another by the time $$\tau = \frac{2H}{c},$$

which corresponds to the propagation time of the wave from aerial 4 to aerial 5 via the ground, H being the mean distance from the aerials to the ground and c being the speed of propagation of the wave.

Mixer 6 forms the beat signal with frequency $f_b$ between the signal derived from the local oscillation and the received signal, and the beat frequency $f_b$ appears as the frequency shift between the slopes of the two sawtooth curves described above. The frequency variations represented by the two curves in question are practically linear and we may write:

$$\frac{\Delta F}{T} = \frac{f_b}{\tau} \qquad (1)$$

$\Delta F$ being the frequency shift, kept constant, of the transmitted or received signal.

The output signal with frequency $f_b$ from mixer 6 is applied via an amplifier 11 to a frequency discriminator 12 whose fixed center frequency is $f_o$ and which delivers a signal E representing the frequency shift $f_b-f_o$. This signal is applied, preferably via an integrating-/anamorphic circuit (not shown) to the control terminal of modulator 2 to modify the slope of the sawtooth modulation signal. There has thus been formed a servo loop whose error signal is formed by the output signal E from discriminator 12. When this loop is stabilized, the error signal is cancelled out and we have:

$$f_b = f_o.$$

The formula (1) above becomes:

$$\frac{\Delta F}{T} = \frac{f_o}{\tau} \tag{2}$$

From this we deduce:

$$T = \frac{2 \Delta F}{c \cdot f_o} \cdot H \tag{3}$$

In expression (3), the factor $$\frac{2 \Delta F}{c \cdot f_o}$$

is known (e.g. constant) and the modulation period T is thus proportional to the height H so that the distance measurement can be provided by a period meter 13 measuring the period T of the modulation signal.

Apart from the basic principle of the known radio altimeter described above, there are also various known means for improving the linearity of the frequency slopes of the signal F(t) and the stability of the parameters $\Delta F$ and $f_o$, all these being directed at improving the accuracy of the measured height H.

Operation of the circuit in FIG. 2 as a radio altimeter presupposes that elements 5 and 8 are each connected directly to an input of mixer 6, as occurs when switches 7 and 8 receive a signal $\overline{DA}$ derived from a sequencer 16.

According to the invention, switches 7 and 9 make it possible to use the circuit in FIG. 2 as a distance meter in association with a transponder described below with reference to FIG. 3. To that end, when the aircraft enters volume V, the signal with frequency F(t) transmitted by aerial 4 is received by the transponder which amplifies it, shifts it time-wise by a fixed time interval $\tau'$, shifts it frequency-wise by a value $F_1$ and $F_2$, respectively, and retransmits it sequentially by means, respectively, of a first and a second receiving/transmitting aerial, in the form R(t). The amplification of the system is sufficient inside volume V for this signal R(t) transmitted, for example by the first aerial of the transponder, to be picked up by aerial 4 which then does duty as a transmitting/receiving aerial. The attenuated signal R(t) is then transmitted via circulator 3 and switch 7 in its position shown in FIG. 2 under the control of signal DA, to the first input of mixer 6. Simultaneously, the local oscillation signal is transmitted via coupler 8, a frequency mixer 14 and switch 9 in its position shown in FIG. 2, under the control of signal DA, to the second input of mixer 6. Mixer 14, which may, for example, be of the single-sideband (SSB) type, receives at a second input, from a frequency generator 15, a signal of frequency $F_1$ so that its output signal follows the same frequency variation as the signal R(t) derived from the transponder. The shifts of frequency $F_1$ existing at the two inputs of the subtractive mixer 6 cancel each other out at the output of this mixer. The shift of frequency $F_1$ effected on the two channels thus makes it possible to select the echo derived from the first receiving/transmitting aerial of the transponder and to eliminate that from the ground, which is also received by aerial 4 in its distance-meter mode. Discriminator 12 then processes a beat signal of frequency $f_{b1}$ which is representative of the distance D between the transponder at point A and the aircraft and this distance D can be measured at 13 by the circuit of FIG. 2 as described above for the altitude H. It will be noted in this case that the echo signal is delayed by the time $\tau'$ and that the formula which enables the distance to be determined is written:

$$f_{b1} = f_o = \left(\frac{2D}{c} + \tau'\right) \frac{\Delta F}{T} \tag{4}$$

from which it can be deduced that:

$$T = \frac{2 \Delta F}{c \cdot f_o} D + \frac{\tau' \Delta F}{f_o} \tag{5}$$

It will be noted that in formulae (4) and (5) the Doppler effect, which is not negligible but which can be eliminated in known fashion, has not been taken into account. There is thus obtained, as for the measurement of the altitude, a straight-line expression for variables D and T, enabling the value of D to be deduced easily by measuring T.

It is an advantage, in implementing the invention, not to modify the aerial base of the radio altimeter when the latter is adapted as a distance meter, and not solely for reasons of simplicity and hence of economy. In fact, when the aircraft enters volume V, it is generally not directed towards axis X for reasons of inaccuracy of the inertial guidance device which have been indicated above and which precisely, it is desired to correct. Under these conditions the transmitting/receiving aerial 4 directed towards the ground, provided it has a sufficiently wide radiation pattern, permits communication with the transponder located at A with a fixed aerial gain whatever the horizontal angle of entry of the aircraft into volume V, the aerials of the transponder, for their part, having an omnidirectional circular radiation pattern and being directed upwards. The advantage thus obtained of an aerial gain independent of the orientation of the aircraft in a horizontal plane is counterbalanced by the fact that this aerial gain is low. That explains why it is necessary to use a transponder capable of providing a high gain, preferably as described below with reference to FIG. 3.

According to the invention, in addition to the means described above to adapt the radio altimeter as a distance-measuring device, the radio altimeter shown in FIG. 2 incorporates an extra signal-processing chain for determination of the angle α. Starting from the common point 17 of switch 7, this chain comprises in cascade connection a second subtractive mixer 18, a second amplifier 19 and an angle-measurement and calculation unit 21. Additionally, unit 21 receives at a second input the output signal from amplifier 11 and the local oscillation signal is transmitted via a second coupler 22 and a frequency mixer 23 to a second input of mixer 18. Mixer 23, which may, for example, be of the single-sideband (SSB) type, receives at a second input, from a second frequency generator 24, a signal of frequency $F_2$ so that its output signal follows the same frequency variation as the signal R(t) derived from the second receiving/transmitting aerial of the transponder. The shifts of frequency $F_2$ present at the two inputs of the subtractive mixer 18 cancel each other out at the output of this mixer. The shift of frequency $F_2$ effected on the two channels thus makes it possible to select the echo derived from the second receiving/transmitting aerial of the transponder and to eliminate that from the ground which is also received by aerial 4 in its mode as an angle-measuring device. For a better understanding of the operating sequence of the device in FIG. 2 and of the manner in which the angle $\alpha$ is determined it is desirable to explain in advance the structure and operation of the transponder with reference to FIG. 3. This transponder, used for the implementation of the invention, is known as to its essentials especially from the above-mentioned French Pat. No. 2 435 866.

Figure 3:
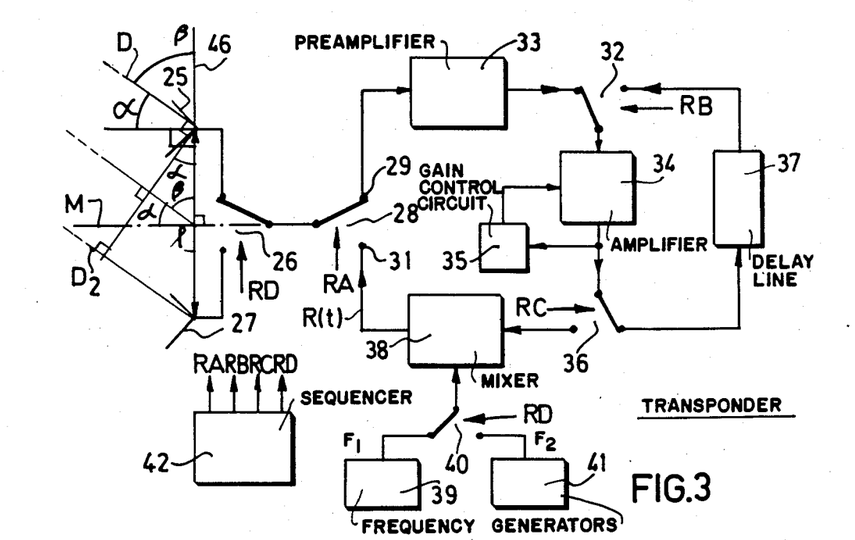
FIG. 3 is a block diagram of the transponder, the essential parts of which are known, but adapted for the implementation of the invention.

The transponder in FIG. 3 enables the decoupling between the signal received and the signal retransmitted to be improved and very high gains to be obtained. First and second receiving/transmitting aerials 25 and 27, respectively, are connected via a two-position UHF switch 26, to the middle terminal of a two-position UHF switch 28 whose contacts 29 and 31 form the input and output terminals of the transponder. Input 29 is connected to a contact of a two-position switch 32. preferably via a preamplifier 33 possessing a good signal-to-noise ratio. The presence of preamplifier 33 is not indispensable but is desirable in so far as it enables the signal-to-noise ratio to be improved, in view of the fact that it is desirable to obtain a high gain. The middle terminal of switch 32 is connected to the input of an amplifier 34 whose gain is regulated by a gain-control circuit 35, basically known, which is looped back between the output of the amplifier and a control input. The output of amplifier 34 is connected to the middle terminal of a two-position switch 36 whose contacts are connected respectively to the input of a delay line 37 and to the input of a frequency mixer 38. The output from the delay line 37 is connected to the other contact of switch 32 and the output of mixer 38 to contact 31 of switch 28. Mixer 38, which may, for example, be of the single-sideband (SSB) type, receives at a second input thereof from a frequency generator 39 or a frequency generator 41, via a two-position switch 40, a signal with a frequency of, respectively, $F_1$ or $F_2$, in such manner that this frequency is, respectively, added to or subtracted from that of the input signal derived from aerial 25 or 27. The output signal R(t) from mixer 38 and hence from the transponder/beacon located at point A is shifted in frequency in relation to the inputs signal of the transponder by the value $F_1$ or $F_2$, in sequence. As has been described above, the local oscillation signal in the on-board modified radio altimeter is shifted by the same value $F_1$ and $F_2$ and in the same sense, i.e. respectively by addition and subtraction of $F_1$ or $F_2$ for comparison in, respectively, mixers 6 and 18, in FIG. 2, with the signal R(t) picked up by aerial 4. The operation of switches 26 and 40 is synchronous, so that frequency generator 39 is associated with the first aerial 25 and frequency generator 41 with the second aerial 27, under the control of a signal RD derived from a sequencer 42. It will be assumed for the moment that switches 26 and 40 occupy the positions shown in FIG. 3.

The transponder in FIG. 3 is called a pseudocontinuous-wave transponder because it transforms a continuous-wave signal derived from the radio altimeter at its input into a chopped output signal. The chopping of the signal does not constitute any disadvantage of the system provided the chopping frequency accords with the sampling theorem in relation to the beat frequencies $f_{b1}$ and $f_{b2}$, respectively, at the outputs of respectively, mixers 6 and 18, in FIG. 2, which are very close to the nominal frequency $f_o$ in the transformed radio altimeter. The frequency of signal RA is double that of signal RD. It is therefore necessary for the frequency of signal RD to be at least double the frequency $f_o$. For the radio altimeter in FIG. 2, frequency $f_o$ is generally chosen lower than 100 kHz and typically equal to 25 kHz or 50 kHz. Consequently, a frequency at least equal to 200 kHz is chosen for signal RD, which entails for signal RA a frequency greater than or equal to 400 kHz.

Switches 26 and 40 being assumed to occupy the positions shown in FIG. 3, the operation of the transponder will be described below accordingly. Three phases of operation can be distinguished, namely a reception phase, an internal-loop or recirculation phase, and a transmission phase. The reception phase is that shown in FIG. 3. The delay time 37 accumulates during a time $\tau_1$ the signal received by aerial 25 and amplified via amplifiers 33 and 34, then switch 32 changes its position under the influence of signal $\overline{RB}$, which marks the start of the recirculation phase for a time which is again equal to $\tau_1$. During the recirculation phase the signal circulates loopwise via elements 34 and 37, the gain provided by amplifier 34 being greater than the attenuation due to the delay line 37. During the recirculation phase switch 28 may occupy any position under the control of signal RA or $\overline{RA}$. At the end of the second consecutive time interval with a duration $\tau_1$, switch 36 in turn changes its position under the influence of signal $\overline{RC}$, as also does switch 28 if this has not already happened in the preceding phase, thus marking the start of the transmission phase of duration $\tau_1$, during which the positions of the contacts of switches 38, 32 and 36 are the opposite of those shown in the figure. The signal is thus transmitted during a time $\tau_1$ after having been delayed a time $\tau'=2\tau_1$, and after having been amplified once by the preamplifier 33 and three times by the amplifier 34. In practice, it is necessary to ensure that the signal transmitted by the transponder and returning after reflection from an obstacle is sufficiently attenuated for there to be no risk of locking on. Since the gain of the transponder can exceed 100 dB, it is necessary to ensure that the time elapsing between the start of a transmission and the start of the next reception is long enough for the risk of locking-on referred to above to be physically impossible because the obstacle causing the echo would have to be too near and too large. By observing a latency time of the order of 1 µs between the end of a transmission and the start of the next reception, it can be shown that all risk of locking-on is eliminated for a signal whose carrier has a wavelength of the order of 10 cm, which corresponds to the UHF frequencies normally used for the system described. This latency time is achieved by holding in the transmission position the three switches 28, 32 and 36 before their simultaneous return to the receiving position. At the end of the latency time the three switches 28, 32 and 36 return to the positions shown in the figure, under the command of the signals RA, RB and RC, respectively, from sequencer 42 and, simultaneously, switches 26 and 40 change their positions under the control of signal RD. The reception-recirculation-transmission operation phase of the transponder described above begins again for reception and transmission by aerial 27. At the end of this phase, which is the same as the end of a cycle of operation of the transponder, switches 26, 28, 32 and 40 all change their positions simultaneously so as to occupy the positions shown in FIG. 3 and the cycle starts all over again.

The duration $\tau_1$ may, for example, be equal to 0.5 $\mu$s, which gives a cycle time of 5 $\mu$s for the transponder, allowing for two latency times of 1 $\mu$s each. During this cycle each aerial receives for 0.5 $\mu$s then, 1 $\mu$s later, transmits for 0.5 $\mu$s and the time between two periods of reception or two of transmission on one and then the other aerial is equal to 2.5 $\mu$s. For each aerial the cyclic ratio is equal to 0.1. This cyclic ratio of the order of 0.1 results in an attenuation equivalent to only several decibels on the signal retransmitted by the transponder.

It will be noted that another mode of operation is possible for the transponder in FIG. 3 in which the recirculation phase is omitted. In this latter case the signal only passes through the delay line 37 once and amplifier 34 twice, and the cyclic ratio becomes equal to 0.125. For this simplified mode of operation switches 28, 32 and 36 operate synchronously under the control of signal RA which is then identical to signals RB and RC.

During the flight of the aircraft or the reconnaisance mission of the missile, the circuit in FIG. 2 is used exclusively as a radio altimeter under the control of signal $\overline{DA}$. When the aircraft or the missile arrives in the vicinity of point A at which the beacon of FIG. 3 is located, or more exactly, starting from a distance at least equal to R/2d, indicated by the inertial guidance device, the circuit in FIG. 2 is controlled by the sequencer 16 so as to perform measurements of distance D and measurements of altitude H alternately. The airborne computing facilities make it possible to deduce the distance L of the aircraft from axis X in accordance with the formula:

$$L = \sqrt{D^2 - H^2} \tag{6}$$

With regard to the device shown in FIG. 2, three operating phases can be distinguished. The first phase, described above, is that during which the device operates as a radio altimeter, switches 7 and 9 being in the opposite positions to those shown in the figure, independently of whether the transponder is operating or not, in accordance with the distance of the circuits in FIGS. 2 and 3 from each other. The second and third phases are obtained when the aircraft is inside volume V, switches 7 and 9 then being in the positions shown in FIG. 2, in which state the measurements of D and $\alpha$ are performed simultaneously. The second phase, already partially described above, is that during which the first aerial 25 of the transponder is active, switches 26 and 40 being in the positions shown in FIG. 3. The third phase is that during which the second aerial 27 of the transponder is active, switches 26 and 40 being in the opposite positions to those shown in FIG. 3. It will be noted that sequences 16 and 42 are not synchronized. During each third phase unit 21 receives the filtered signal (i.e. freed from the sampling due to the switching of the transponder) with a frequency $f_{b2}$ such that:

$$f_{b2} = \left( \frac{2 D_2}{C} + \tau' \right) \frac{F}{T} \tag{7}$$

where $D_2$ is the distance separating aerials 4 and 27. The signal with frequency $f_b$ (or $f_o$) derived from aplifier 11 is transmitted symmetrically to unit 21 after filtering, i.e. after having been freed from the sampling due to the switching of the transponder. Formula (7) can be compared with formula (4) above in which D represents exactly the distance between aerials 4 and 25. The segments of length D and $D_2$ can be considered as parallel at their extremity connected to the transponder and as merging together at their extremity connected to the device in FIG. 2, with very good approximation, since the distances D and $D_2$ are of the order of several hundreds of meters whereas the distance L separating aerials 25 and 27 is of the order of a meter. The result is that the angle $\alpha$ to be determined, which is the angle which the aircraft/transponder direction makes with the median plane M between the two aerials 25 and 27, satisfies the formula:

$$\sin \alpha = \frac{D_2 - D}{1} \tag{8}$$

On the other hand, by combining equations (4) and (7) we obtain:

$$f_{b2} - f_o = \frac{2 \Delta F}{cT} (D_2 - D) \tag{9}$$

The difference $f_{b2} - f_o$ as an algebraic value can be expressed in the form of a number of periods which is an increasing linear function of time or also of an "overall phase change" $\alpha$, greater than $2\pi$ as an absolute value, and having the form:

$$\phi = 2\pi(f_o - f_{b2})t \tag{10}$$

taking a suitable origin for t, i.e. for each sawtooth, the point assumed common at which the three straight lines in equations F(t) and R(t) (frequencies as a function of time) for the signal transmitted by either of the aerials 25 and 27 intersect the axis of the abscissae, i.e. the time axis. Reasoning along these lines we make an approximation which is of the same nature as that made above for the segments of length D and $D_2$ but reversed in the sense that here we assume non-parallel straight lines which in reality are. This approximation is nevertheless a very good one since the frequencies involved are of the order of several GHz for the signals of frequencies F(t) and R(t), whereas the value of $\phi$ is of the order of several cycles to several tens of cycles. Moreover, frequency F as a function of time of the signal of frequency F(t) for each sawtooth with the origin indicated above, is written $$F = \frac{\Delta F}{T} t \tag{11}$$

Combining formulae (8) and (11) above, we obtain $$\phi = \frac{4 \pi F L}{c} \sin \alpha \tag{12}$$

or $$\sin \alpha = \frac{\lambda}{4 \pi L} \phi \quad (13)$$

with:

$$\lambda = c/F.$$

In equation (13) the values of λ (or F) and L are known with great precision but the angle φ cannot be measured directly. It is only possible to measure with a fairly good accuracy, of the order of one degree, its representative as an algebraic value $\phi_o$ whose module is less than $2\pi$ and whose sign is either that which applies to φ (and hence to α) or the opposite sign. The measurement of $\phi_o$, which is properly speaking a phase measurement, thus gives rise to an indefiniteness and does not suffice for the correct valuation of φ to within only a degree when the absolute value of angle φ is of the order of several hundreds to several throusands of degrees.

The angle φ can thus be expressed as a function of $\phi_o$ in one of the following two formulae:

$$\phi = \phi_o + 2k \text{ if } \phi \text{ is positive}$$

$$\phi = \phi_o - 2k \text{ if } \phi \text{ is negative} \quad (14)$$

where k is a positive integer.

To overcome the ambiguity associated with a measurement of $\phi_o$, it will be observed that since F varies during the sawtooth modulation, the same applies to φ, by virtue of formula (12) so that, for example, between the start ($\phi_1$, $F_1$) and the end ($\phi_2$, $F_2$) of the sawtooth, we have:

$\Delta \phi = \phi_2 - \phi_1$, or, by virtue of formula (12):

$$\Delta \phi = \frac{4 \pi \, l \sin \alpha}{c} (F_2 - F_1) \quad (15)$$

or:

$$\Delta \phi = 4 \pi \, l \frac{F}{c} \sin$$

hence:

$$\sin \alpha = \frac{c}{4 \pi \Delta F} \Delta \phi \quad (16)$$

Δφ is an electrical angle which has the sign of α and which, for the application envisaged for the invention, rarely exceeds $2\pi$. It should be noted that when Δφ is greater than $2\pi$ its value can be measured since it represents the variation between the relative phase shifts of two signals during a given time interval which comprises only a relatively low number of cycles for the signals $f_{b1}$ and $f_{b2}$. The principle for the measurement of $\phi_o$ may be the following: at the moment when the sine curve of the beat signal of the channels passes through zero, counting of the pulses from a 4 MHz clock generator commences, using a first counter. A second counter commences counting when the sine curve of the best signal of the other channel passes through zero. By the end of the sine curve of the first channel the counter may, for example, have counted 100. At that instant the second counter may be, for example, at 20. The phase shift is therefore:

$$\phi_o = \frac{2 \pi \times 20}{100} = 0.4$$

in this example. For calculation of Δφ it is, for example, possible to repeat the calculation shown above for $\phi_o$ for each pair of sine curves and cumulate the small differences obtained each time between two consecutive sine curves, from the start to the end of the duration T of modulation.

For an accuracy of the measurement of Δφ comparable with the accuracy obtained for $\phi_o$, i.e. approximately one degree, formula (15) gives a lower accuracy than formula (13) for sin α, as will be seen below, but on the other hand, it permits the determination of sin α without ambiguity.

It is then possible to measure the angle Δφ as to amplitude and as to sign, e.g. as described above, the sign being also that of α and hence of φ by virtue of formulae (16) and (13), to calculate the value of sin α using formula (16) and writing it sin αΔφ, to substitute this value of sin αΔφ in formula (12) and to derive therefrom by calculation a first approximate value of the angle φ, which will be denoted φΔφ. On the other hand, $\phi_o$ is also measured and will preferably be identical with $\phi_1$. Comparison of the signs of Δφ and of $\phi_o$ makes it possible to deduce which of formulae (14) will be used for determination of k (φ and $\phi_o$ have the same sign). For example, if it is the second of these formulae which is applicable, the value of k is defined as the integer value nearest to the calculated value, which is equal to $$\frac{\phi_o - \phi_{\Delta\phi}}{2 \pi}.$$

The calculation of φ is repeated in reverse starting from the same formula (14) which permitted determination of k, using the integer value found for k, and this last correct value found for φ is finally substituted in formula (13) which then makes it possible to calculate the value of sin α and subsequently of α with the desired accuracy. We thus obtain, by derivation from formula (12);

$$\frac{d\phi}{d\phi} = \frac{4 \pi F l}{c} \cos \alpha \quad (17)$$

which means, assuming l=1 m, F=$F_1$=4 GHz, for example, that:

for α=0, dα=0.06 dφ for α=30°, dα=0.069 dφ i.e. an error of ±1° for φ corresponds approximately to 0.06° for α.

On the other hand, if it were desired to determine α from only the value of Δφ, we would obtain, by derivation from formula (15):

$$\frac{d(\Delta \phi)}{d} = \frac{4 \pi \Delta F L}{c} \cos \alpha$$

which means that, assuming d=1 m, ΔF=100 MHz ($F_1$=4.2 GHz, $F_2$=4.3 GHz), for example:

$$d\alpha = \frac{0.24}{\cos \alpha} d(\Delta \phi) \qquad (18)$$

i.e. an accuracy four times less than above on the basis of formula (17).

It should be noted that for $l=1$ m and $F_1=4.2$ GHz, the angle $\phi$ varies by $2\pi$ when $\alpha$ varies by 2.1° around 0° or by 2.5° around 30°. Given the numerical application chosen above, the accuracy obtained for $\alpha$ as deduced from formula (18) is thus sufficient to be assured that the correct value for k can be determined from one of the formulae (14). In fact, experience obtained with the type of radio altimeter considered shows that phase shifts can be measured with an accuracy of the order of ±1° i.e. an error of 2° on the phase variation. In cases where this accuracy would not be sufficient, the situation can easily be remedied by increasing the value of L and/or that of $\Delta F$.

Known means for putting into operation the known measurement and calculation process explained above are described and illustrated very precisely in the French patent application No. 2 481 465 (corresponding to U.S. Pat. No. 4,464,662) in the name of the present applicant, and will not be discussed again here in order not to make the description harder to absorb. These means are contained in unit 21, in FIG. 2, at output 25 of which an electrical signal representing the angle $\alpha$ is made available. In practice, the angle $\beta$ is also determined. $\beta$ is the complement of angle $\alpha$, which is the angle made by the line joining the aircraft and the transponder with axis 46 passing through aerials 25 and 27.

The accuracy with which angle $\alpha$ and hence $\beta$ are obtained depends on that angle itself. What is being discussed here are the absolute values of $\alpha$ and $\beta$ between 0° and 90°. The error is around 0.4° when angle $\alpha$ is small ($\beta$ in the vicinity of 90° in absolute value) and increases progressively when it arrives in the vicinity of 90° ($\beta$ in the vicinity of 0°). For $\alpha=35°$, the error exceeds 2°. Beyond that value, all it is possible to know is that the aircraft is at ±5° to the axis 46 defined by the transponder.

When the position of the aircraft has to be determined in a system of axes connected to the point of landing, the radio altimeter switches to its mode of operation as a device for the measurement of distance and angle in cooperation with the transponder. This is achieved automatically and independently, in the aircraft, by the taking into account of parameters R and d (see FIG. 1). The operating cycle of switches 7 and 9, in FIG. 2, is triggered at an estimated distance of the aircraft from point A which is of the order of 2d+R, the aim intended being that this operating cycle should have already begun when the aircraft enters volume V. If range R is not known in the aircraft, this estimated distance may be linked only to d and, for example, chosen arbitrarily equal to a value which is of the order of 5d. The period of the operating cycle of switches 7 and 9 may be linked to the speed of the aircraft so that determination of angles $\alpha$ and $\beta$, of the distance D and of altitude H is performed at intervals of 50 to 100 m or so. These two items of distance and angle information being combined with the altitude previously measured in the radio-altimeter mode are sufficient, subject to a certain indefiniteness, to calculate the position of the missile. In fact, distance D enables the aircraft to recognize its position on a sphere of center A and radius D, the angle on a cone with a half-angle at the apex, whose axis is the axis 46 linking the aerials of the transponder, and the altitude H defines a horizontal plane. The intersection of this plane with the cone and the sphere is formed by two points. The choice between these two points is effected by an examination of the sign of the change of distance, by means of a second angle and distance determination, as described below with reference to FIG. 4.

Figure 4:
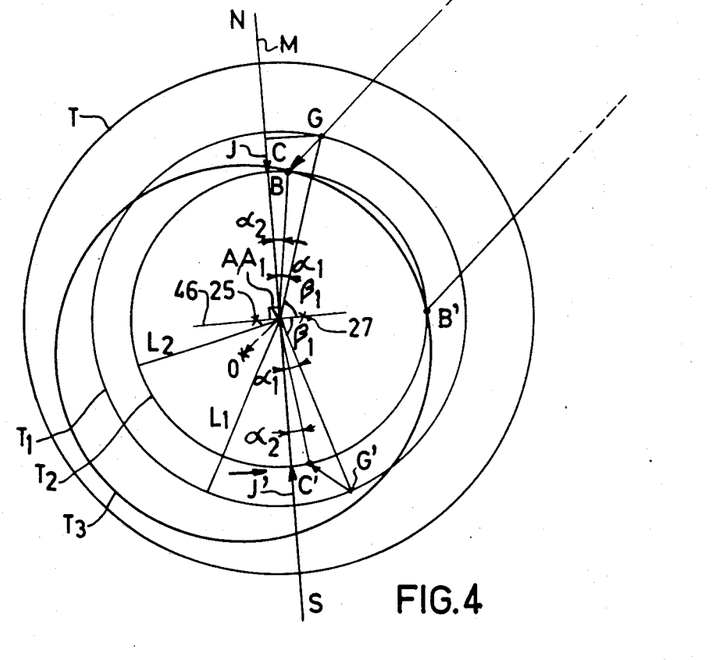
FIG. 4 illustrates a preferred form of embodiment of the guidance system according to the invention.

FIG. 4 is a view from above of the arrival or position-adjustment zone of the aircraft, on which are shown the circle T and points A and $A_1$, which coincide in the figure. Two determinations at short intervals of distance L, namely $L_1$ and $L_2$, by measurement of D and H and calculating using formula (6) are performed on board the aircraft inside circle T without its being necessary to modify the independent path of the aircraft, at instants $t_1$ and $t_2$, respectively. The first distance determined, $L_1$ at instant $t_1$, enables the aircraft to establish that it is on a circle $T_1$ of center $A_1$ and radius $L_1$. Similarly, the second distance $L_2$ at instant $T_2$ enables the aircraft to establish that it is on a circle $T_2$ smaller than $T_1$, of center $A_1$ and radius $L_2$. Furthermore, thanks to its inertial guidance device and an on-board compass, the aircraft knows at any instant its horizontal speed vector $\vec{V}$. At time $t_2$ the aircraft is also on circle $T_3$ with center O and radius $L_1$, obtained by translation of circle $T_1$ in accordance with the vector:

$$\vec{AO} = \int_{t_1}^{t_2} \vec{v}(t)dt,$$

i.e. for instants $t_1$ and $t_2$ at close intervals; as a first approximation: $\vec{AO}=\vec{v}(t_2-t_1)$. Circles $T_2$ and $T_3$ intersect at two points B and B'. At instant $t_2$ therefore, the aircraft is at either point B or B'. The positions of points B and B' can be calculated accurately and rapidly, in known fashion, by the on-board computing facilities. It is still necessary, however, to remove the ambiguity as to the position of the aircraft due to the existance of two possible points. However, the determinations of angles $\alpha_1$ and $\alpha_2$ which are also available just after instants $t_1$ and $t_2$, respectively, also lead for their part to the availability of two possible points. These two points, C and C', necessarily belong to the plane $A_1$ B B' in FIG. 4 since they belong to a horizontal plane and at least one of them must coincide with B or b'. The point at which the aircraft is located at instant $t_2$ is therefore that which is obtained by means of the two calculations referred to above, namely the calculation based on the distances and the calculation based on the angles, the principle of which is described below:

The first angle calculation $(\alpha_1, \beta_1)$ just after instant $t_1$ makes it possible to determine the points G and G' possible on circle $T_1$, the orientation of plane M, e.g. south-north, being presumed known on board the aircraft. Similarly, the second angle calculation $(\alpha_2, \beta_2)$, just after instant $t_2$, makes it possible to determine points C and C' possible on circle $T_2$. Of the four possible points B, B', C and C', the correct point, i.e. the one at which the aircraft is located at instant $t_2$, is the point which is obtained from the two calculations described above, i.e. point B, coinciding with point C. Another way to proceed consists in performing only the angle calculation, which makes it possible to determine points G and G', then C and C', and in considering vectors $\vec{GC}$ and $\vec{G'C'}$ and their respective projections $\vec{J}$ and $\vec{J'}$ in plane M. It will be noted that the speed vector $\vec{v}$ of the aircraft follows the direction either of the vector $\overrightarrow{GC}$ or vector $\overrightarrow{G'C'}$. But the speed vector $\vec{v}$ and also the orientation of plane M are known in the aircraft. It is therefore sufficient to determine the orientation of the projection of $\vec{v}$ in the plane M, then to compare this orientation with that of the vectors $\vec{J}$ and $\vec{J'}$ deduced from the angle calculation. That one of the two vectors $\vec{J}$ and $\vec{J'}$ for which the same orientation is obtained, namely vector $\vec{J}$, makes it possible to deduce which of the two vectors $\overrightarrow{GC}$ or $\overrightarrow{G'C'}$ corresponds to the real independent path of the aircraft, in this case vector $\overrightarrow{GC}$. On the basis of the exact information available in the aircraft as to the position of the latter at a known instant (point C at time $t_2$). The final guidance phase can be carried out, in a known fashion, so as to reach point A or A' other by means of the inertia guidance device, whose position error has just been corrected, or by means of the guidance system itself, formed by the height, distance and angle-measurement device and the beacon/transponder in FIGS. 2 and 3, the latter case being in fact preferred when the aircraft is a helicopter.

A particular case of indefiniteness may occur with the system described above; the frequency of its occurrence is linked to the accuracy obtained on the measurements and calculations referred to above, when the speed vector of the aircraft in the vicinity of its point of arrival is parallel to the axis 46 of the transponder's aerials. When such a case, which is in fact very rare, is detected in the aircraft, the removal of doubt can be achieved very easily by an automatic change-of-path command enabling the orientation of the speed vector of the aircraft to be modified considerably in the vicinity of point A, and then the series of measurements and calculations described above to be repeated. If need be, a command to execute a loop path can be carried out, in the course of which the aircraft may leave the volume V, the series of measurements and calculations being repeated when the aircraft enters volume V for the second time with a speed vector $\vec{v}$ whose orientation has been considerably modified, or just after the end of this loop path.

It will be noted that, since the orientation of $\vec{v}$ and that of axis 46 are known at all times in the aircraft, the path modification in an essentially horizontal plane which must render $\vec{v}$ non-parallel to axis 46 can be carried out just before the aircraft enters volume V, e.g. at the moment when the cyclic sequence of switches 7 and 9 is triggered. In this case care must be taken to ensure that the path is modified only slightly, i.e. only be several degrees in order to ensure that the aircraft definitely enters volume V. If need be, the range of the transponder can be increased for the employment of this last variant, e.g. by increasing the wavelength λ. As a variation, if it is detected that the speed vector $\vec{v}$ is parallel to the axis 46 it can be arranged that the aircraft follows its course in accordance with its independent path. In that case, either the aircraft will pass through point $A_1$, which is the objective aimed at, or the angle α will decrease to the point of becoming measurable with the accuracy acquired to remove the ambiguity, by the mere fact of repeating the calculations explained above with reference to FIG. 4.

The system described above permits a detection range R of the order of a kilometer for a wavelength of the order of 7 cm and for an aerial-gain product $G_e \times G_r$ of the order of unity. By comparison, the average values of the position error d of the aircraft are of the order of 400 m; the particular arrangement, already described, of aerials 4, 25 and 27 means that a great scattering of the total gain of the interrogator/transponder system can be expected if no precaution is taken, which might cause saturation at certain points of the system when the aerials are too close to each other during the distance measurement. To overcome this disadvantage, aerials 25 and 27 of the responder are aerials whose radiation pattern is preferably cosecant-squared and whose gain is less than 0 dB below the horizontal. Standardization of the aerial gains is obtained as a first approximation by giving aerials 25 and 27 a gain G such that:

$$G = D^2/H^2 \tag{19}$$

or:

$$G = \frac{1}{1 - \cos^2\gamma} \tag{20}$$

γ being the angle in a vertical plane, not shown, at which the aircraft is seen from the transponder at point A. Aerials 25 and 27 of the transponder may be circularly polarized or each formed by two elementary aerials with linear polarization, perpendicular to each other.

It will be noted that it is also possible, without exceeding the limits of the invention, in order to adapt the radio altimeter as a distance-measuring device, to adapt the receiving aerial 5 of the radio altimeter as a transmitting/receiving aerial, by reversing the respective locations of circulator 3 and switch 7 in the diagram in FIG. 2. The radiation pattern of aerial 5 must then be sufficiently wide.

What is claimed is:

1. A position control system for aircraft including a radio altimeter installed aboard the aircraft for measurement of the altitude H and for cooperation with a transponder installed on the ground at a site A, the radio altimeter being of the frequency-modulated continuous-wave type and having a transmitting aerial and a receiving aerial directed towards the ground, the transponder being of the pseudo-continuous-wave type comprising switches for effecting operation at different radio frequencies and at least one transmitting aerial, characterized in that the radio altimeter is adapted for performing a first sequence of measurements where the measurement of altitude H is performed alternately with the measurement of distance D and the angle β in relation to a horizontal axis extending to the transponder, said system comprising:

(a) in the radio altimeter, first means for adapting the transmitting aerial as a transmitting/receiving aerial connected via a circulator and the common contact of a two-position UHF switch to two mixtures each receiving at a second input thereof a respective local oscillation frequency, frequency-shifted by a predetermined value of $F_1$ and $F_2$, respectively, and a chain for processing a signal from the transponder, said chain including one of the mixers for determination of the angle β; and (b) in the transponder, an aerial base comprising two omnidirectional receiving/transmitting aerials directed upwards and separated by a predetermined distance l from one another on the horizontal axis whose orientation is known on board the aircraft, said aerials being selectively connected to an input/output point of the transponder by means of a UHF switch controlled in accordance with a second sequence occurring within the first sequence, the second sequence also causing in the transponder frequency shifts of $F_1$ and $F_2$, respectively, of the signal;

the operating range of the system including the volume defined by the distance accuracies d and h peculiar to the aircraft for its independent return, and the exact position of the aircraft in the immediate vicinity of point A being determined, upon the aircraft's return, by at least two measurements of the distance D and the angle $\beta$ in relation to the aerial base of the transponder.

* * * * *